Figure 1:
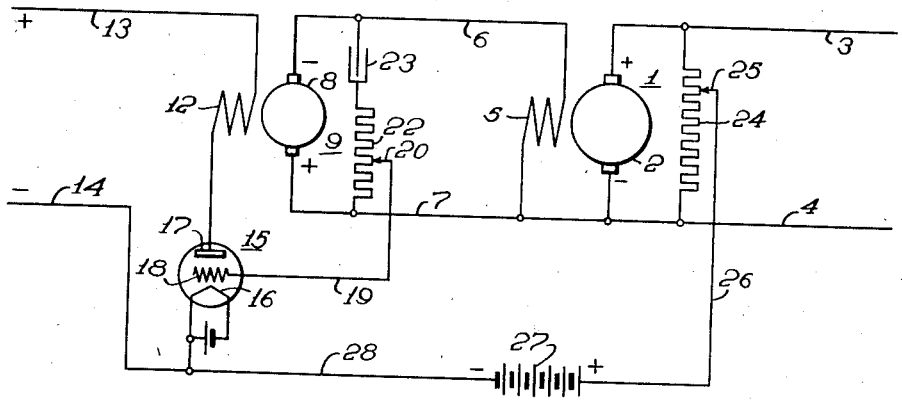

Nov. 12, 1940.                F. H. GULLIKSEN                2,221,579
                               VOLTAGE REGULATOR
                              Filed May 16, 1939

WITNESSES:
Edward Michaels
Mr. C. Groome

INVENTOR
Finn H. Gulliksen.
BY
Franklin E. Hardy
ATTORNEY

Patented Nov. 12, 1940

2,221,579

UNITED STATES PATENT OFFICE 2,221,579

VOLTAGE REGULATOR

Finn H. Gulliksen, Pittsburgh, Pa., assignor to Westinghouse Electric & Manufacturing Company, East Pittsburgh, Pa., a corporation of Pennsylvania Application May 16, 1939, Serial No. 273,861

7 Claims. (Cl. 171—229)

My invention relates to regulators and particularly to the provision of dynamic anti-hunting mechanisms therefor.

In regulators, such, for example, as voltage regulators, it has been necessary to provide anti-hunting or stabilizing means for introducing into the action of the regulator an influence that will anticipate the return of the regulated voltage to its desired value after it has departed therefrom, and after a corrective influence has been established to effect its return. The anticipating or anti-hunting influence is required in order to interrupt or taper off the corrective influence before the regulating operation has been completed, so that the time delay between the variation in the voltage applied to the field winding and the resulting generator output voltage will not cause an appreciable overswing in the output voltage beyond the desired value.

The problem of designing an anti-hunting circuit that develops sufficient power and that gives an output current that is proportional to the rate of change of the generator voltage has been an important one in the design of electromagnetic types of regulators.

In electronic type regulators, anti-hunting action can be easily obtained by means of a capacitor discharge circuit consisting of a capacitor connected in series with a resistor across the exciter armature or the field winding of the regulated generator. This circuit is not applicable to electromagnetic types of regulators, because the size and cost of the capacitor necessary to obtain sufficient energy for effecting the necessary modification in the energization of the electromagnet is prohibitive.

A practical anti-hunting device for electromagnetic type regulators that is now in common use consists of a transformer having an air gap, the primary winding of which is connected to a direct-current source corresponding to a function of excitation of the regulated machine and which produces a secondary voltage that is proportional to the rate of change of the primary voltage. Because of the saturating characteristics of such direct-current transformers, they are bulky and expensive, and it is not practicable to easily adjust the anti-hunting characteristics of such devices to suit different types of machines.

An object of this invention is the provision of a dynamic type anti-hunting means which will give sufficient energy output for application to all electromagnetic types of regulators and which may be easily adjusted to suit different machine characteristics.

Figure 2:
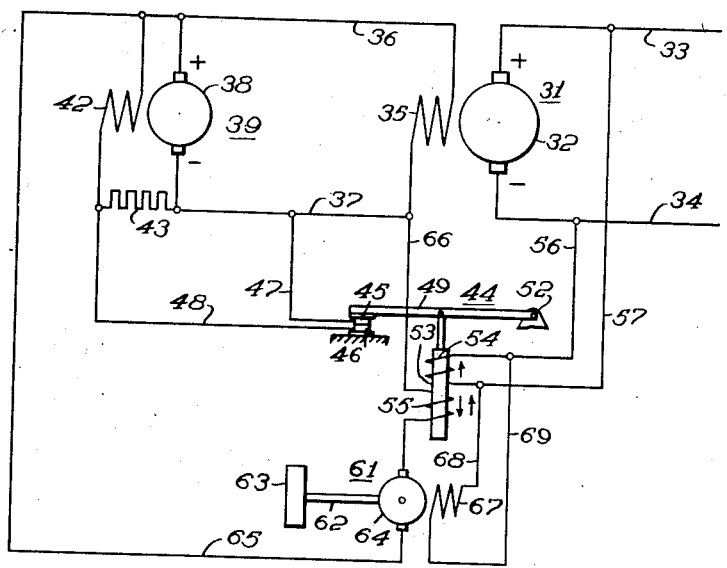

Other objects and advantages of the invention will be apparent from the following description of a preferred embodiment thereof, reference being had to the accompanying drawing, in which:

Figure 1 is a diagrammatic view of circuits and apparatus illustrating in simple form an electronic regulator employing a capacitor type anti-hunting circuit; and Fig. 2 is a diagrammatic view of circuits and apparatus illustrating an application of a dynamic type anti-hunting mechanism to an electromagnetic type regulator.

Referring to Figure 1, a direct-current generator 1 is illustrated having an armature winding 2 connected to circuit conductors 3 and 4 and a field winding 5 connected by means of conductors 6 and 7 to the armature winding 8 of an exciter generator 9, which is provided with a field winding 12 connected to be energized from a suitable direct-current source indicated by the conductors 13 and 14. As illustrated, the energization of the field winding 12 is controlled by the operation of a single three-element vacuum tube 15 having a cathode 16, an anode 17 and a control grid 18. The grid 18 is connected by conductor 19 and a tap switch 20 to an intermediate point on a resistor 22 that is connected in series with a condenser 23 across the armature winding 8 of the exciter generator 9. A resistor 24 is shown connected across the armature winding 2 of the main generator 1 from a selected intermediate point of which the cathode 16 of the tube 15 is connected through a tap switch 25, conductor 26, a standard battery 27 and conductor 28.

The complete grid circuit extends from the cathode 16 through conductor 28, battery 27, conductor 26, a portion of the resistor 24 from the tap switch 25 to conductor 7, the portion of the resistor 22 between conductor 4 and tap switch 20, and conductor 19 to the grid 18. The polarity of the voltages introduced into this circuit by the battery 27 and the resistors 24 and 22 is indicated in the drawing. In the operation of the regulator system, the voltage of the generator 1 will be so controlled that the potential drop in that portion of the resistor 24 included in the grid control circuit is slightly greater than that of the standard potential battery 27, thus causing the potential of the grid element 18 of the vacuum tube 15 to be maintained at a negative value with respect to the cathode 16. For a particular value of the tube grid bias, the tube passes the proper amount of current to energize the winding 12 sufficiently to maintain the voltage of the generator 1 at the normal or desired value.

An increase in the voltage of the generator 1 acts to increase the negative bias impressed upon the vacuum tube 15 as the voltage across the resistor 24 increases, thus causing a decrease in the current supplied to the exciter generator field winding 12 which results in a lowering of the generator voltage toward the desired value.

As the exciter-generator voltage is lowered, the flow of current from the condenser 23, which has been previously charged to the potential of the exciter-generator, causes current to flow through the resistor 22 in a direction to increase the bias on the tube 15 to recalibrate the regulator in proportion to the rate of change of the exciter armature voltage and in this manner stabilize the regulator operation.

Similarly, a decrease in the voltage of the generator 1 causes a decrease in the voltage across the resistor 24, thus reducing the negative grid bias impressed upon the vacuum tube 15, thereby increasing the conducting properties of the tube and causing the exciting current flowing to the winding 12 to effect an increase in the voltage of the exciter 9. This effects a corresponding increase in the excitation of the generator 1 and in the output voltage applied to conductors 3 and 4. As the voltage across the armature of the exciter generator 9 increases, the charging current to the condenser 23 will cause current to flow through the resistor 22 in a direction to introduce a negative component into the grid circuit of the tube 15, so as to recalibrate the regulator in proportion to the rate of change of the exciter armature.

The dynamic capacitor type anti-hunting means shown in Fig. 2 is designed to have substantially the same characteristic operation as that shown in Fig. 1. Referring to Fig. 2, a direct-current generator 31 is illustrated having an armature winding 32 connected to circuit conductors 33 and 34 and a field winding 35 connected by conductors 36 and 37 to be energized from the armature winding 38 of an exciter generator 39, that is provided with a field winding 42 shown connected to be excited from the armature winding through a regulating resistor 43 in accordance with the operation of an electromagnet type regulator 44 shown in simple form as comprising a pair of contact members 45 and 46 connected by conductors 47 and 48 in shunt relation to the regulating resistor 43. The contact member 46 is illustrated as stationary and the contact member 45 as mounted upon a movable lever 49 that is movable about a pivot 52 and connected to be operated by an electromagnet having a core plunger 53 and operating solenoid windings 54 and 55 thereon. The winding 54 is connected by circuit conductors 56 and 57 to a voltage source that is a measure of the voltage of the generator 31 that is being regulated. As indicated by the arrow, the voltage applied to the winding 54 acts upwardly or in a direction to separate the contact members 45 and 46 when the generator voltage exceeds the desired value. The regulator operates in a well known manner to vary the effective value of the control resistor 43 by intermittently closing and opening the circuit through conductors 47 and 48 in shunt relation to the resistor 43.

In this regulator system, a dynamic energy storing means is provided for performing the function performed by the capacitor 23 in the system of Fig. 1 by the flow of current between it and the exciter generator in either direction, and which comprises a small direct-current dynamoelectric machine 61 connected by a shaft 62 to a flywheel 63 and arranged to operate as a motor or generator. The machine 61 includes an armature winding 64 connected in a circuit extending from the positive terminal of the armature winding 38 of the exciter generator 39 through conductor 65, the armature winding 64, stabilizing winding 55, conductors 66 and 37 to the negative terminal of the exciter generator armature 38. The motor is also provided with a field winding 67 which may be connected by conductors 68 and 69 to be energized in accordance with the output voltage of the main generator 31. It may in some applications of the device be desirable to connect the field winding 67 to a separate constant voltage source of direct current energy.

The motor may be of small capacity such as 1/20 or 1/30 horsepower rating, and may be provided with ball bearings to eliminate as far as possible the losses due to friction. The voltage applied to the field winding is preferably such as to produce a saturated magnetic circuit which is permissible in this application because of the relatively light load on the motor.

When the exciter voltage is constant, the current flowing through the armature winding 64 of the machine 61 is low because the only energy required is that necessary to overcome friction and windage losses, which are small. This small current has little effect on the regulator 44. If, however, the voltage of the exciter generator 39 is varying as a result of the operation of the regulator 44, a current will flow through the winding 55 and the armature of the motor 61 in a direction to oppose the movement of the plunger 53 that has caused the regulator action to be initiated.

If, for example, the voltage of the generator 31 increases due to a decrease in generator load, the upward pull on the plunger 53 from the winding 54 increases, causing the contact member 45 to be separated from engagement with the contact member 46 and introduce the resistor 43 in circuit with the field winding 42 to decrease the excitation of the exciter generator 39, thus causing a decrease in the output voltage of the exciter generator 39 and of the main generator 31. As the exciter generator voltage decreases, the relatively higher voltage across the armature 64 of the machine 61 causes this machine to serve as a generator and convert the stored energy in the flywheel 63 into electric energy, thus effecting the flow of current through the winding 55 in a direction such that the flux generated thereby opposes the flux from the winding 54 in the core 53, so as to decrease the upward pull on the solenoid 53 and close the circuit through the contact members 45 and 46 before the output voltage of the generator 31 has reached its normal value.

If on the other hand the generator voltage 31 decreases, thus decreasing the upward pull of the winding 54 on the plunger 53 causing engagement of the contact members 45 and 46 and an increase in the output voltage from the exciter generator 39 and the main generator 31, the resulting increase in exciter generator voltage causes the flow of current through the winding 53 in the opposite direction from that previously described, or in a direction to increase the energy supplied to the inertia device comprising the machine 61 and the flywheel 63 to cause the motor speed to increase and increase the energy stored in the flywheel 63. The flow of energy from the exciter generator 39 to the machine 61 is in such direction that the magnetic flux developed by the flow of current in the winding 55 aids that developed by the flow of current in the winding 54 and increases the upward pull on the core 53 to separate the contact members 45 and 46 sooner than would be the case if controlled by the winding 54 alone, or before the voltage of the generator 31 has reached its normal or desired value.

The purpose of the flywheel 63 is to act as an energy storing means, the stored energy being increased as the motor speed is increased, and discharged through the machine 61 acting as a generator as the machine speed decreases, so that the current through the regulator anti-hunting winding 55 varies in direction and amount as a function of the direction and rate of change of exciter armature voltage upon the flow of energy from the exciter to the machine 61 or from the machine 61 to the exciter with an increase or a decrease in the exciter voltage above or below the voltage of the machine 61. It is possible to express the dynamic capacity of the machine 61 operating, as shown, in terms of the capacity of an equivalent condenser by the equation:

$$C_{DYN} = \left(\frac{77N}{60E}\right)^2 \frac{WR^2}{22} \cdot 10^6 \text{ microfarads}$$

in which:

$C_{DYN}$ = the dynamic capacity in microfarads,
$N$ = the motor speed in revolutions per minute,
$E$ = the potential in volts across the machine 61,
$W$ = the weight of the flywheel in pounds,
$R$ = the radius of the flywheel in feet.

Assuming for example:
$N = 1000$ R. P. M.,
$E = 125$ volts,
$W = 5$ pounds,
$R = 0.25$ foot,
it is found that the dynamic capacity is:
$C_{DYN} = 2500$ microfarads.

From the illustration given, it will be seen that with the arrangement of apparatus shown in Fig. 2, the energy stored in the unit dynamic capacitor employing a 1/20 horsepower, 125 volt motor will provide the same anti-hunting effect as could be obtained if a 25,000 microfarad capacitor were connected in series with the winding 55. From the above equation, it will be seen that the anti-hunting characteristics of the unit may be adjusted to suit various types of machines by adjustment of the motor speed, the armature voltage, the flywheel inertia $WR^2$ or by adjustment of the number of turns of the winding 55 on the plunger 53.

It will be appreciated that the particular type of regulator illustrated is shown for convenience in representing a simple electromagnetic regulator, and that other magnet and lever constructions may be employed. The anti-hunting means disclosed is particularly applicable to regulator applications in which large anti-hunting forces are desirable, such, for example, as in controlling the speed of direct-current motors of large capacity in such applications, for example, as steel mills and the like.

It will be apparent to those skilled in the art that many modifications may be made in the apparatus and circuits illustrated without departing from the spirit of my invention, and I do not wish to be limited otherwise than by the scope of the appended claims.

I claim as my invention:

1. In a system comprising a dynamo-electric machine having a field winding, means for supplying an exciting current to said field winding, a voltage regulator including electromagnetically operated means for controlling said exciting current, and a circuit for impressing upon said electromagnetically operated means a control force determined by the machine voltage, the combination of dynamic means for modifying the energization of said electromagnetically operated means in response to variations in the voltage at which said exciting current is supplied to said field winding in a direction to oppose hunting action.

2. In a system comprising a dynamo-electric machine having a field winding, means for supplying an exciting current to said field winding, a regulator including electromagnetically operated means for controlling said exciting current, and a circuit for impressing upon said electromagnetically operated means a control force determined by a regulated characteristic of the machine, the combination of dynamic energy storing means supplied with energy from the source of said exciting current through a circuit including means for modifying the energization of said electromagnetically operated means in response to variations in the voltage at which said exciting current is supplied to said field winding.

3. In a system comprising a dynamo-electric machine, means for supplying an exciting current thereto, a regulator including electromagnetically operated means for controlling said exciting current, and a circuit for impressing upon said electromagnetically operated means a control potential determined by a regulated characteristic of the machine, the combination of a continuously rotating energy storing inertia device, a circuit for supplying energy thereto at a voltage determined by the voltage at which said exciting current is supplied, said circuit including a winding for modifying the energization of said electromagnetically operated means to prevent hunting of the regulated characteristic.

4. In a system comprising a dynamo-electric machine, means for supplying an exciting current thereto, a regulator including electromagnetically operated means for controlling said exciting current, and a circuit for impressing upon said electromagnetically operated means a control potential determined by the machine voltage, the combination of an energy translating device comprising an electric motor and a flywheel driven thereby, an energy transferring circuit between the motor and the source of said exciting current including means for modifying the energization of said electromagnetically operated means in response to the direction of power flow through said energy translating circuit to prevent hunting of the regulated quantity.

5. In a voltage regulating system comprising a dynamo-electric machine having a field winding, an exciter generator for energizing said field winding, and a regulator for controlling the excitation of the exciter generator comprising an electromagnet responsive to generator voltage, the combination of an energy translating device comprising a direct-current electric motor and a flywheel driven thereby, said motor having a field winding energized at a voltage that is a measure of the voltage of the dynamo-electric machine and an armature winding energized at a voltage that is a measure of exciter voltage, means including a winding on said electromagnet for modifying the operation thereof in accordance with the flow of current to and from said energy translating device for preventing hunting of the regulator.

6. In a regulator system, in combination, an electric generator having a field winding, means for supplying an exciting current to said field winding, an electromagnetically operated regulator responsive to the output voltage of said generator for controlling said exciting current, an energy translating device comprising a dynamo-electric machine and a flywheel connected thereto, an energy transferring circuit between said dynamo-electric machine and the source of said exciting current including means for increasing or decreasing the energization of said regulator in response to the direction of power flow through said energy transferring circuit to prevent hunting of the regulated voltage.

7. In a regulator system, in combination, a direct current electric generator having a field winding, means for supplying an exciting current to said field winding, an electromagnetically operated regulator responsive to the output voltage of said generator for controlling said exciting current, an energy translating device comprising a dynamo-electric machine and a flywheel connected thereto, said dynamo-electric machine having a field winding energized at a voltage that is a measure of the voltage of the generator, an energy transferring circuit between said dynamo-electric machine and the source of said exciting current to which a voltage is supplied that is a measure of the voltage across the field winding of said generator, said circuit including means for increasing or decreasing the energization of said regulator in response to the direction of power flow through said energy transferring circuit to prevent hunting of the regulated voltage.

FINN H. GULLIKSEN.